United States Patent [19]

Wise

[11] Patent Number: 4,867,437
[45] Date of Patent: Sep. 19, 1989

[54] METHOD AND APPARATUS FOR STACKING SHEET ARTICLES IN THEIR ORIGINAL ORDER IN A SELECTED ONE OF A PAIR OF HOPPERS

[75] Inventor: George Wise, San Antonio, Tex.

[73] Assignee: The Psychological Corporation, San Antonio, Tex.

[21] Appl. No.: 160,821

[22] Filed: Feb. 26, 1988

[51] Int. Cl.⁴ ........................................... B65H 29/66
[52] U.S. Cl. ..................................... 271/291; 271/303; 209/657
[58] Field of Search .............. 271/291, 303, 304, 258, 271/265, 289, 290, 298; 209/657, 656

[56] References Cited

U.S. PATENT DOCUMENTS

| | | | |
|---|---|---|---|
| 3,416,791 | 12/1968 | Beckman, Jr. et al. | 271/65 |
| 3,523,687 | 8/1970 | Petersen et al. | 271/71 |
| 3,556,512 | 1/1971 | Fsvklrt | 271/4 |
| 3,833,911 | 9/1974 | Caldwell et al. | 346/74 ES |
| 3,856,295 | 12/1974 | Looney | 271/65 |
| 3,948,505 | 4/1976 | Miller et al. | 271/64 |
| 4,306,712 | 12/1981 | Schroeder | 271/298 |
| 4,334,673 | 6/1982 | Clifton | 271/65 |
| 4,712,785 | 12/1987 | Stemmle | 271/291 |
| 4,721,298 | 1/1988 | Pitcher, Jr. | 271/303 |

Primary Examiner—Kevin P. Shaver
Assistant Examiner—Kenneth Noland
Attorney, Agent, or Firm—Kenyon & Kenyon

[57] ABSTRACT

The disclosure relates to an attachment for a scanner apparatus which electrically scans the markings on the upper face of test score sheets. The attachment stacks score sheets in either a main hopper or a reject hopper with the sheets being stacked in either hopper in the sequence in which the sheets were scanned. Thus, the first sheet after having its upper face scanned is inverted and placed on the bottom of a hopper with the face surface directed downwardly. Each subsequent test score sheet is inverted and placed on the prior score sheet. When removed from either hopper, a stack of sheets can be inverted as an entirety, thereby establishing the faces of the score sheets in their original order. The stack can then be conveniently run back through the scanner or other apparatus. Shunt gates provide the two functions of inverting the sheets and selectively directing them into one of the two hoppers in their original order without the need to reverse the direction of movement of the sheets and without the need of placing one of the hoppers above the other.

22 Claims, 3 Drawing Sheets

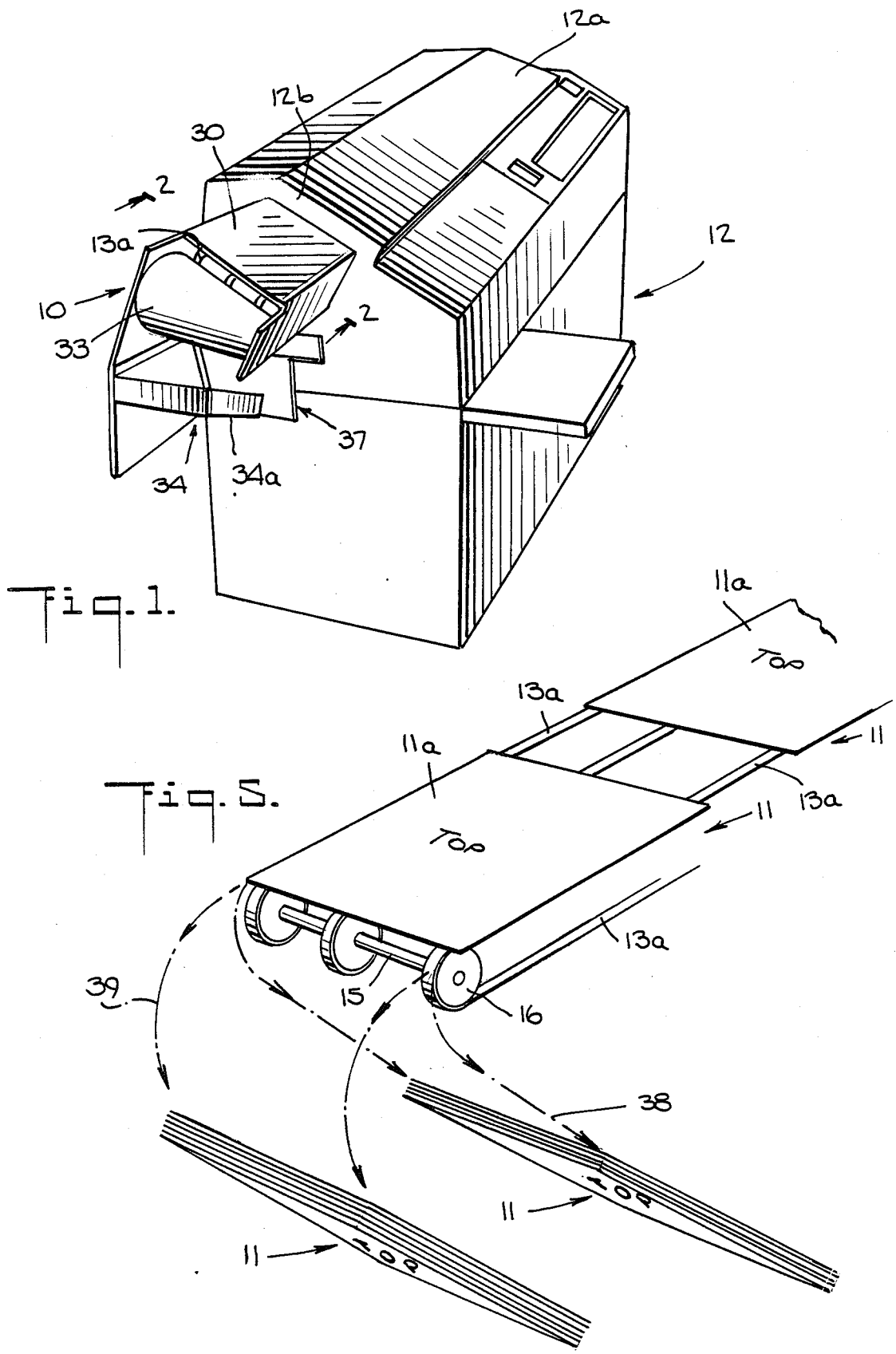

METHOD AND APPARATUS FOR STACKING SHEET ARTICLES IN THEIR ORIGINAL ORDER IN A SELECTED ONE OF A PAIR OF HOPPERS

BACKGROUND OF THE INVENTION

1. Field of the Invention

In systems for processing stacks of articles in sheet form such as sheets of papers and then restacking the articles, the articles upon restacking assume a reverse order if the second article processed is stacked on the first and so forth. In order to avoid a reversal of order in the restacked articles, the articles are inverted after processing and then restacked. The result is that the first inverted article is restacked face down with the second inverted article face down on the first and so forth. The result is that after restacking, the original order is not reversed notwithstanding that the restacked stack has the first article on the bottom. Upon inverting the entire restacked stack, the resulting stack is in the same order as the stack preceding processing.

In systems for processing stacks of articles in sheet form, it is also desired to deliver the articles into selected ones of a plurality of hoppers while maintaining the original order of the articles.

In grading test answer sheets which are machine readable, a stack of test sheets are fed sequentially through a scanner apparatus which reads, scores, and records the test results. The score sheets after being scanned are stacked in a hopper in the reverse of the order of the test sheets originally delivered to the scanner apparatus. Since the test sheets are often rerun through the scanner apparatus as a check or because of a fault in scanning, it becomes necessary to restack the scanned test sheets to return the sheets from the reverse order or to the original order prior to a rescan. Such restacking is either done by hand or by running the stack of reverse order through the scanner apparatus without scanning to restore the original order.

2. Description of the Prior Art

It is known to invert sheets or documents after processing in xerographic machines and before placement in a tray or hopper in order to maintain the original order of the sheets or documents. Without inverting the sheets or documents, their original order becomes reversed when the sheets are placed sequentially in a tray or hopper one upon the other.

The apparatus of each of U.S. Pat. Nos. 4,469,323, 4,220,323, 4,040,616, and 3,615,129 invert sheets when moving in a downward direction for the purpose of restoring the original order of the sheets; however, the deflectors of such apparatus for inverting the sheets do not alone selectively direct the inverted sheets into a selected one of two hoppers. In the 4,469,323 patent, an array of secondary deflectors are utilized to direct the inverted sheet from a main deflector into one of a plurality of trays in a sorter. The apparatus of the 4,220,323 patent has only one hopper for inverted sheets while the deflector itself serves as a hopper for the univerted sheets. In the 4,040,616 patent, the deflector for inverting the sheets is held stationary while the hoppers of the sorter for receiving the sheets are moved. In the 3,615,129 patent, a movable deflector directs the sheets downwardly for inverting the sheets and placing the same in a hopper in a duplex xerographic process.

In U.S. Pat. No. 3,948,505, the direction of travel of the sheet is reversed. A movable gate inverts the sheet into either of two stacks as directed by the rotational position of a gate.

U.S. Pat. No. 3,700,231 shows a movable baffle which can direct sheets upwardly to place them in their original order on one tray or to permit the sheets to move downwardly and accumulate on another tray in reverse order.

SUMMARY OF THE INVENTION

The method and apparatus of the invention relate to the inverting and stacking of sheet material such as score sheets upside down to maintain their original order. The method and apparatus comprise the use of a controlled shunt gate to invert the sheets and direct them in their original order selectively into either one of two hoppers offset from one another. Thus, the shunt gate of the invention provides two functions, viz. inverting the sheets and selectively directing them into one of two hoppers in their original order without the need to reverse the direction of movement of the sheets and without the need of placing one of the hoppers above the other.

It is therefore an object of the invention to provide a method and apparatus for inverting sheet material before stacking in a predetermined one of a pair of hoppers in order to maintain the original order of the sheet material being stacked.

It is another object of the invention to provide an apparatus having a selectable gate movable between two positions for inverting and directing sheet material into one of a pair of hoppers as determined by the selected position of the gate.

It is a further object of the invention to provide a method and apparatus for inverting and stacking sheet materials in their original order when attached to apparatus for processing the sheet material.

It is also an object of the invention to provide a method and apparatus for inverting and stacking sheet materials when discharged by a processing apparatus and into one of a pair of hoppers in response to an input signal from the processing apparatus.

BRIEF DESCRIPTION OF THE DRAWINGS

FIG. 1 is a perspective view showing the apparatus of the invention for stacking test sheet materials in their original order when attached to a test sheet scanning apparatus;

FIG. 5 is a fragmentary perspective view of a path of sheet material advancing adjacent the deflector and a path of sheet material advancing adjacent the concave surface portion of the shunt gates of the invention.

DESCRIPTION OF THE PREFERRED EMBODIMENTS

Figure 3:
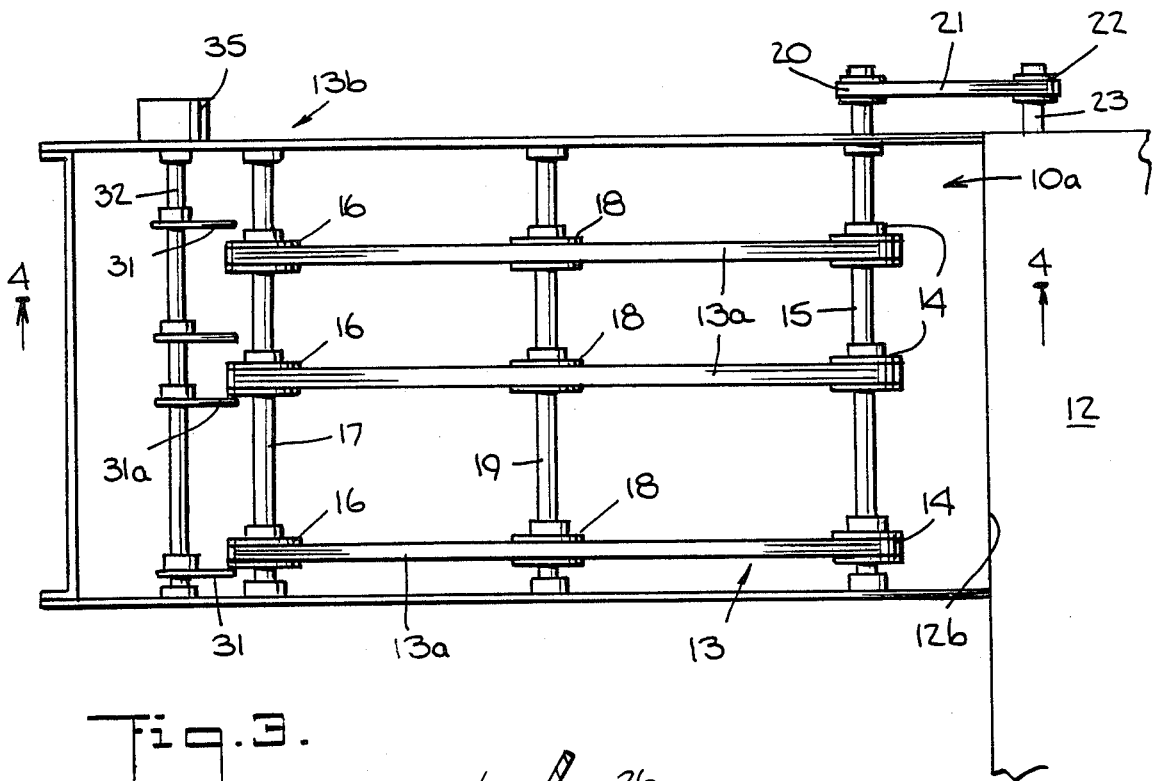
FIG. 3 is an inclined section view taken along the line 3—3 in FIG. 2 showing the shunt gates adjacent the exit end of the endless belt conveyor of the apparatus of the invention.

As shown in FIG. 1, the apparatus of the invention comprises an apparatus attachment 10 for stacking a plurality of articles of sheet material 11 such as test sheets in the same order and in the same relative position of the same face portion 11a of each of the plurality of articles or sheets. In the case of test sheets, the upper face portion 11a of the sheets as viewed in FIG. 5 bear markings which are to be scanned by apparatus 12. The attachment 10 thus is adapted to be coupled to and used in conjunction with scanning apparatus 12 (FIG. 1) which is adapted to scan or machine-read markings on test answer sheets. Test sheets to be scanned are delivered to scanning apparatus 12 at the entrance portion 12a thereof. Within the scanning apparatus the test sheets are fed from a stack of sheets in a predetermined order with the same face portion 11a of each of the test sheets facing in the same direction within the stack. Normally the scanning apparatus 12 delivers the scanned test sheets from exit portion 12b thereof to a receiving device such as a hopper (not shown). Within such a hopper each sheet is received with face 11a facing upwardly and accordingly each successive sheet is stacked in an order which is the reverse of the order of the sheets as they were originally delivered to entrance portion 12a of the scanning apparatus.

If it is desired to rescan the already scanned test sheets by passing them through the scanning apparatus a second time, it is first necessary to restore the original order of the test sheets either by manually restacking the sheets or by passing the sheets in reverse order through the scanning apparatus, but without performing the scanning function, in order to restore the original order. Once restored to the original order, the stack of sheets can be delivered to the scanning apparatus for a second scan.

The attachment 10 of the invention enables the sequence of test sheets 11 being advanced from exit portion 12b of the scanning apparatus to be inverted before stacking. The result is that the first sheet scanned is stacked with its face 11a facing downwardly (as shown in FIG. 5) and each successive sheet is placed upon the preceding sheet with its face 11a also facing downwardly. Consequently, the sheets are accumulated in the same order as they were delivered to scanning apparatus 12. Therefore, in order to rescan the sheets, is simply necessary to invert the previously scanned stack of test sheets as an entirety and deliver them once again to the entrance portion 12a of the scanning apparatus.

Figure 4:
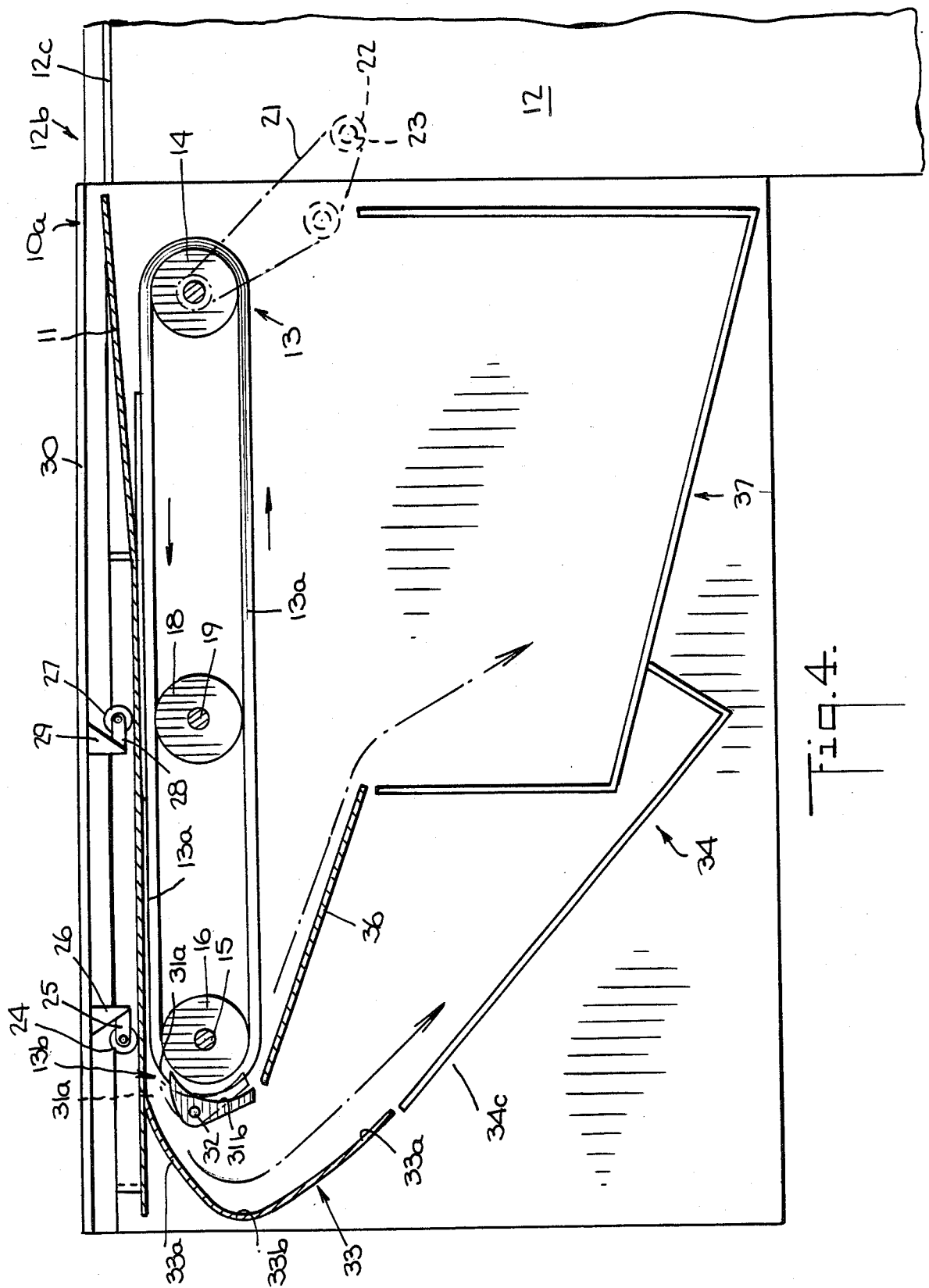
FIG. 4 is a vertical section view taken along the line 4—4 in FIG. 3 showing the shunt gates of the invention for directing the sheet material selectively into the reject hopper or the main hopper, each underlying the endless belt conveyor.

In FIG. 1, the direction of travel of test sheets 11 is shown by arrows for scanning apparatus 12 and attachment 10. Attachment 10 is mounted with its entrance portion 10a positioned adjacent to exit portion 12b of the scanning apparatus. As shown in FIG. 4, test sheets 11 pass from plate 12c of the scanning apparatus and enter upon conveying means or endless belt conveyor 13. As shown in FIG. 3, conveyor 13, by way of example, can comprise three endless belts 13a disposed about pulleys 14 mounted on shaft 15 and pulleys 16 mounted on shaft 17. The upper reach of each of belts 13a is supported midway between pulleys 14 and 16 by pulleys 18 mounted upon shaft 19.

In order to operate endless belts 13a in synchronism with the operation of scanning apparatus 12, endless belts 13a are driven by a belt 21 mounted on pulley 20 and pulley 22. Pulley 22 is mounted on shaft 23 of the scanning apparatus. Since shaft 23 is coupled to the drive (not shown) for advancing the sheets 11 within the scanning apparatus, shaft 23 can maintain synchronization by driving belt 21 and thereby shaft 15 upon which pulley 20 is mounted. Accordingly, belts 13a can be controlled to operate at the same lineal speed as the conveying elements (not shown) for advancing the test sheets within the scanning apparatus. Therefore, a test sheet 11 when leaving exit portion 12b of scanning apparatus 12 at a predetermined lineal speed as shown in FIG. 4, the test sheet can enter smoothly upon belts 13a which are operating at the same lineal speed. In this way, belts 13a can continue to advance the test sheets within the attachment 10 at the same speed as that of scanning apparatus 12.

Figure 2:
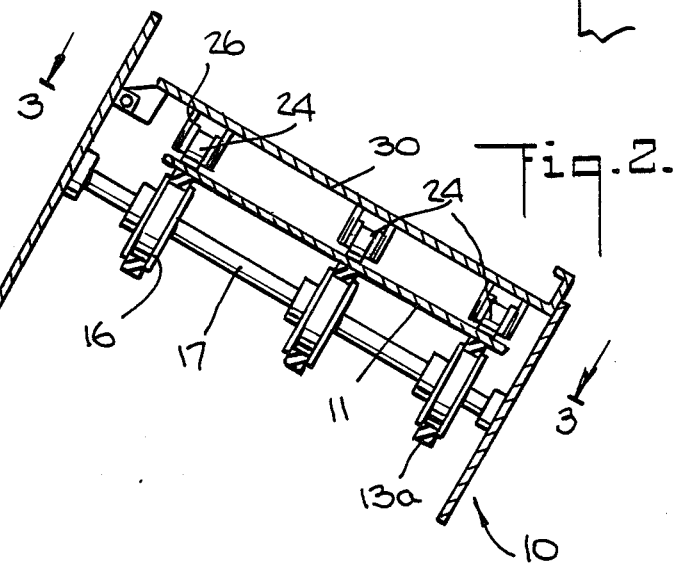
FIG. 2 is a vertical section view of the exit end portion of an endless belt conveyer and a reject hopper of the apparatus of the invention.

As shown in FIG. 4 there are provided a pressure rollers 24 mounted on spring-loaded arms 25 which are each pivotally attached to a bracket 26 to urge the test sheets 11 against belts 13a. The pressure rollers 24 are substantially in alignment with pulleys 16 carrying the endless belts. The same arrangement is used adjacent to pulleys 18 where pressure rollers 27 mounted on spring loaded arms 28 supported by brackets 29 direct the test sheets against the endless belts. As shown in FIGS. 2 and 4 the brackets 26 and 29 for supporting the pressure rollers are mounted on the lower surface of cover 30 of the attachment 10.

Shunt gates 31 shown in FIGS. 3 and 4 are mounted upon shaft 32. Each of the shunt gates has a convex surface portion 31a and a concave surface portion 31b. Downstream of the exit portion 13b of the conveying means 13 there is disposed U-shaped deflector 33 having an upper portion 33a, an intermediate portion 33b, and a lower portion 33c. Lower portion 33c of the deflector is in alignment with bottom surface 34a of shunt hopper 34.

As shown in FIGS. 1 and 2, the plane of travel of the upper reaches of belts 31a is inclined from the horizontal at an angle which substantially corresponds to the angle of inclination of the path of travel of the sheets through the scanning apparatus 12. It can also be seen in FIG. 1 that the bottom plate 34a of shunt hopper 34 as its lowermost portion disposed substantially parallel to the base of the scanning apparatus 12, that is substantially parallel to the horizontal with the bottom plate 34a extending upwardly toward deflector 33 (FIG. 4). Consequently, a test sheet when delivered to bottom plate 34a enter into a plane different than that of the upper reaches of the endless belts 13a of the attachment. Accordingly, the deflector is not only U-shaped but is cone-shaped, i.e., a warped surface, as shown in FIG. 1 to facilitate the travel of a test sheet from the endless belt downwardly into shunt hopper 34.

Shaft 32 upon which the shunt gates 31 are mounted is adapted to be positioned between an extreme clockwise position shown by solid lines in FIG. 4 in which the tip portion 31a of each of the gates is disposed beneath the path of travel of the endless belts 13a. The alternate extreme position of the shunt gates is shown by dash lines in FIG. 4 in which the tip portion 31a of each of the shunt gates is moved to a counterclockwise extreme position in which the tip portions are above the path of travel of the endless belts 13a. As shown in FIG. 3, shaft 32 is positioned alternately in its extreme clockwise or counterclockwise position by actuator 35 which can be a rotary solenoid device.

When shaft 32 is rotated clockwise as viewed in FIG. 4, the tips 31a on the gauge 31 are moved away from the path of travel of the outer surface of the endless belts 13a. Accordingly, test sheets contact the concave surface 31b of the gates and are inverted onto slide 36. The sheets can then pass in the direction of the arrow adjacent slide 36 into main hopper 37. The path of travel of the test sheets upon contacting the concave surfaces of the gates is shown by arrows 38 in FIG. 5. The path of travel of the test sheets about the convex surface 31a of the gates 32 when they are in their clockwise extreme position as viewed in FIG. 4 is shown by arrows 39 in FIG. 5.

Figure 6:
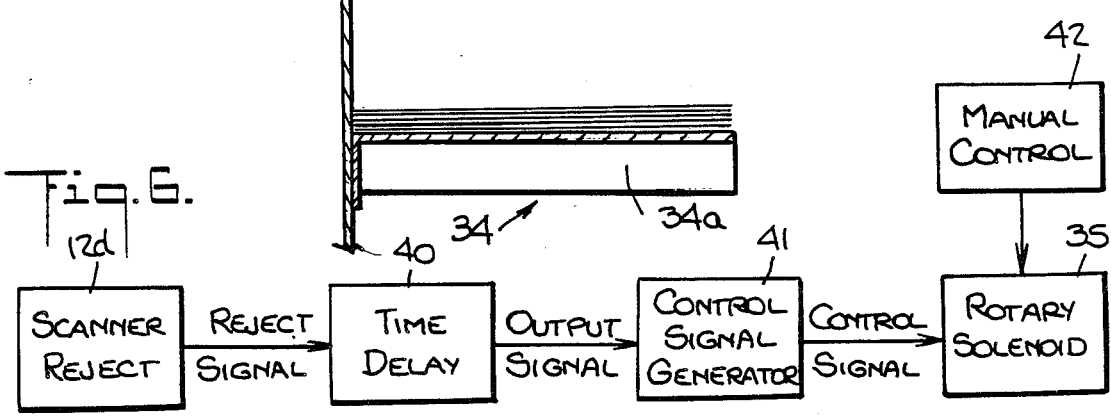
FIG. 6 is a block diagram of a circuit for controlling the position of the shunt gates of the invention.

When the attachment 10 of the invention is used in conjunction with a scanning apparatus for test sheets, the attachment is adapted to handle the problem created by the fencing of a defective test sheet or a sheet which is erroneously scanned, and must be rejected from the test sheets being accumulated in the main hopper 37. As shown in FIG. 6, scanner 12 contains reject sensor 12d which produces an electrical reject signal in response to the scanning of a defective test sheet or an error in scanning. Once a reject signal has been produced, it is intended to direct the test sheet to which the reject signal relates into the reject or shunt hopper 34 in order that the test sheet not be stacked with the remainder of the test sheets in the main hopper 37. Since there is a transit time for a test sheet 11 which has resulted in a reject signal to travel from the location within the scanning apparatus 12 at which the reject condition has been detected, it is necessary to delay control of the shunt gates 32 for a time period corresponding to that taken by a given test sheet to travel from the location of the sensing of the reject condition to the location of the shunt gates 32. Accordingly, the reject signal is inserted into time delay device 40 which can comprise a time delay relay, an electromechanical timing device, or the like which delays the production of an output signal for a time interval corresponding to the predetermined time period necessary for a test sheet to travel from the point of detection of the reject condition to the shunt gates 32. When the output signal is delivered to control signal generator 41, a control signal is delivered to the drive device 35 for the shaft 32 of the shunt gates, such as rotary solenoid. When actuated by the control signal, the rotary solenoid 35 drives shaft 32 clockwise as viewed in FIG. 4 with the result that the sheet to be rejected passes over the convex side 31a of the gates and enters into the shunt hopper 34. Upon termination of the control signal, the rotary solenoid 35 returns shaft 32 to its extreme counterclockwise position as viewed in FIG. 4 with the result that subsequent sheets contact the concave side 31d of the shunt gates and enters into the main hopper 37. Manual control of rotary solenoid 35 can be achieved by operation of manual controller 42 which results in the rotary solenoid 35 being maintained in the condition in which shaft 15 is in the counterclockwise position as shown in FIG. 4 and thereby shunt gates 32 in the extreme counterclockwise position. The result of this is that sheets 11 can be delivered to the shunt hopper 34 without the occurrence of a reject signal within scanning apparatus 12.

At the conclusion of a scanning operation, it can be seen that the test sheets scanned without a reject condition or a manual override, are accumulated in main hopper 37. By removal of the stack of sheets of main hopper 37 and inversion thereof as an entirety, the stack of sheets resulting are in the order in which they were originally delivered to scanning apparatus 12. Similarly, the sheets accumulated in shunt hopper 34 are also in the order of the original stack of sheets delivered to the scanning apparatus 12.

It should be understood that the delivery of sheet material to the main hopper or the shunt hopper need not be performed on the basis of rejected sheet material. Thus, by control of the shunt gates, sheet material can be delivered to either hopper in response to manual control or automatic control.

OPERATION

The attachment 10 receives test score sheets 11 with the face 11a bearing test answer markings facing upwardly as viewed in FIG. 4. Endless belts 13a on rollers 14, 16 and 18 advance the sheets 11 through the nips formed by pressure rollers 24 and 27. When shunt gates 31 are rotated counterclockwise to place tips 31a thereof spaced apart from endless belts 31a, the score sheets pass beneath the shunt gates and onto tray 36 as shown by dash lines in FIG. 4. The score sheets are thereby inverted by passage along the concave surface of the gates and placed in main hopper 37. Since each score sheet when arriving in main hopper 37 is inverted and placed above the top sheet in the hopper, the sheets are stacked in the order of scanning with the first scanned sheet at the bottom. If it is intended to rescan the sheets, the stack of sheets is removed from hopper 37, inverted in its entirety, and delivered to scanner 12 for rescanning.

If one or more of the score sheets is to be rejected after scanning and thereby not placed in the stack of sheets in main hopper 37, shunt gates 31 are rotated clockwise as viewed in FIG. 4 with tips 31a thereof adjacent to belts 13a. The sheets then pass over the convex surface 31b of shunt gates, along deflector 33, and into reject or shunt hopper 34. The sheets are stacked in reject hopper 34 with the first scanned sheet at the bottom and with the surface thereof bearing markings facing downwardly.

By means (not shown), a sheet to be rejected is electrically sensed in the scanner 12 and a reject signal is produced in response to the sensing. The reject signal is delayed by time delay device (FIG. 6) until the sheet to be rejected has travelled from the scanner to adjacent the entrance to the shunt gates 31. The delayed reject signal then activates rotary solenoid 35 which causes the shunt gates to rotate clockwise for a time period sufficient to enable the rejected sheet to be directed toward reject hopper 34. The gates then return in the counterclockwise direction to their normal position for directing sheets to main hopper 37.

What is claimed is:

1. In an apparatus for stacking a plurality of articles of sheet material in the same order and the same relative position of the same face portion of each of the plurality of articles when delivered to the apparatus, the improvement comprising:

means for sequentially receiving each of the plurality of articles in sheet form from a stack of articles having a predetermined order for the plurality of articles and a predetermined relative position of the same face portion of each of the plurality of articles therein;

means coupled at its entrance end portion to the receiving means for conveying the plurality of articles sequentially in a stream along a predetermined path toward its exit end portion with each of the articles being in the predetermined order and with the same face portion of each of the articles facing upwardly with respect to the conveying means;

means disposed downstream of the exit end portion of the conveying means and having a predetermined concave surface adapted to engage sequentially the same face portion of each of the articles in the stream for inverting the engaged articles as they advance with respect to the predetermined surface portion;

a pair of hoppers disposed downstream of the inverting means for stacking the articles in the same order and the same relative position of the same face portion of each of the plurality of articles;

a gate disposed between the exit end portion of the conveying means and adjacent the predetermined concave surface of the inverting means, the gate having oppositely disposed convex and converse surface portions with the convex surface portion facing the concave surface of the deflecting means and the concave surface portion facing the exit end portion of the conveying means; and means for alternately positioning the gate between a first predetermined position in which the convex surface portion of the gate is adapted to engage the articles thereon and is adjacent the inverting means to direct the articles to one of the hoppers and in a second predetermined position thereof in which the concave surface portion is adapted to engage the articles thereon and to direct the articles into the other of the hoppers.

2. In an apparatus in accordance with claim 1 in which the conveying means comprises a conveyor having endless belt elements with upper and lower reaches extending along the predetermined path with an entrance and portion disposed adjacent the receiving means and an exit end portion disposed adjacent the inverting means and the gate, the articles being adapted to be disposed upon the upper reach of the conveyor.

3. In an apparatus in accordance with claim 2 in which the conveyor comprises an endless belt conveyor.

4. In an apparatus in accordance with claim 3 in which the conveying means further comprises a pressure plate overlying and adjacent the endless belt for urging the articles of sheet material against the endless belt.

5. In an apparatus in accordance with claim 1 in which the inverting means comprises a substantially U-shaped deflector having the predetermined concave surface, the predetermined concave surface having an axis of curvature about which it extends disposed substantially parallel to the path of travel of the articles and transverse to the direction of travel of the articles, the U-shaped deflector having a first edge portion extending parallel to the axis of curvature of the U-shaped deflector adjacent the exit end portion of the conveying means and a second edge portion extending substantially parallel to the axis of curvature of the U-shaped deflector and opposite the first edge portion, the second edge portion being disposed adjacent one of the hoppers.

6. In an apparatus in accordance with claim 5 in which the first edge portion of the deflector of the portion of the predetermined surface adjacent the first edge portion are spaced apart in a facing relationship with the convex surface portion of the gate when the gate is in the first predetermined position thereof, thereby causing each article of sheet material to advance between the convex surface portion of the gate and the predetermined surface portion of the deflector.

7. In an apparatus in accordance with claim 1 in which one of the pair of hoppers is disposed adjacent to and beneath the inverting means to receive each of the inverted articles of sheet material engaged by the predetermined surface of the inverting means.

8. In an apparatus in accordance with claim 7 in which the other hopper of the pair of hoppers is disposed beneath the conveying means adjacent the exit end portion thereof to receive each of the inverted articles of sheet material engaged by the concave surface portion of the gate when the gate is in the second predetermined position thereof.

9. In an apparatus in accordance with claim 1 in which the gate comprises a pivotally mounted shaft extending transverse to the predetermined path of the stream of articles and a plurality of gate elements mounted spaced apart from one another on the shaft, each gate element having the oppositely disposed convex and concave surfaces.

10. In an apparatus in accordance with claim 9 in which the means for alternately positioning the gate comprises means for alternately rotating the shaft upon which the gate elements are mounted between the first and second predetermined positions.

11. In an apparatus in accordance with claim 1 and further comprising means responsive to a control input for activating the gate means, means for generating a control input for a predetermined article of sheet material, and means for delaying the input for activating the gate means for a predetermined article to be conveyed by the conveying means to adjacent the gate.

12. In an apparatus for stacking a plurality of test answer sheets in the same order and the same relative position of the same face portion of each of the plurality of test sheets when the apparatus is attached to a machine for scanning the plurality of test sheets, the improvement comprising:

means for sequentially receiving each of the plurality of test sheets from a stack of test sheets having a predetermined order for the plurality of test sheets and a predetermined relative position of the same face portion of each of the plurality of test sheets therein;

means coupled at its entrance end portion to the receiving means for conveying the plurality of test sheets sequentially in a stream along a predetermined path toward its exit end portion with each of the test sheets being in the predetermined order and with the same face portion of each of the test sheets facing upwardly with respect to the conveying means;

means disposed downstream of the exit end portion of the conveying means and having a predetermined concave surface adapted to engage sequentially the same face portion of each of the test sheets in the stream for inverting the engaged test sheets as they advance with respect to the predetermined surface portion;

a pair of hoppers disposed downstream of the inverting means for stacking the test sheets in the same order and the same relative position of the same face portion of each of the plurality of test sheets;

a gate disposed between the exit end portion of the conveying means and adjacent the predetermined concave surface of the inverting means, the gate having oppositely disposed convex and converse surface portions with the convex surface portion facing the concave surface of the deflecting means and the concave surface portion facing the exit end portion of the conveying means; and means for alternately positioning the gate between a first predetermined position in which the convex surface portion of the gate is adapted to engage the test sheets thereon and is adjacent the inverting means to direct the test sheets to one of the hoppers and in a second predetermined position thereof in which the concave surface portion is adapted to engage the test sheets thereon and to direct the test sheets into the other of the hoppers.

13. In an apparatus in accordance with claim 12 in which the inverting means comprises a substantially U-shaped deflector having the predetermined concave surface, the predetermined concave surface having an axis of curvature about which it extends disposed substantially parallel to the path of travel of the test sheets and transverse to the direction of travel of the test sheets, the U-shaped deflector having a first edge portion extending parallel to the axis of curvature of the U-shaped deflector adjacent the exit end portion of the conveying means and a second edge portion extending substantially parallel to the axis of curvature of the U-shaped deflector and opposite the first edge portion, the second edge portion being disposed adjacent one of the hoppers.

14. In an apparatus in accordance with claim 13 in which the first edge portion of the deflector of the portion of the predetermined surface adjacent the first edge portion are spaced apart in a facing relationship with the convex surface portion of the gate when the gate is in the first predetermined position thereof, thereby causing each test sheet to advance between the convex surface portion of the gate and the predetermined surface portion of the deflector.

15. In an apparatus in accordance with claim 12 in which one of the pair of hoppers is disposed adjacent to and beneath the inverting means to receive each of the inverted test sheets engaged by the predetermined surface of the inverting means.

16. In an apparatus in accordance with claim 15 in which the other hopper of the pair of hoppers is disposed beneath the conveying means adjacent the exit end portion thereof to receive each of the inverted test sheets engaged by the concave surface portion of the gate when the gate is in the second predetermined position thereof.

17. In an apparatus in accordance with claim 13 and further comprising means for synchronizing the rate of conveying of the test sheets by the conveying means with the rate of the scanning operation of the scanning machine.

18. In an apparatus in accordance with claim 13 and further comprising means for activating the gate positioning means in response to the scanning operation of the scanning machine.

19. In a method for stacking a plurality of test sheets in the same order and the same relative position of the same face portion of each of the plurality of test sheets when delivered, the improvement comprising:

sequentially receiving each of the plurality of test sheets from a stack of test sheets having a predetermined order for the plurality of test sheets and a predetermined relative position of the same face portion of each of the plurality of test sheets therein;

conveying the plurality of test sheets being received sequentially in a stream having a predetermined direction and extending along a predetermined path toward an exit end portion thereof with each of the test sheets being in the predetermined order and with the same face portion of each of the test sheets facing upwardly with respect to the conveying means;

downstream of the exit end portion of the predetermined path sequentially engaging the same face portion of each of the test sheets in the stream having the predetermined direction to advance the test sheets with respect to a curvilinear path to invert the test sheets;

stacking the inverted test sheets in the same order and the same relative position of the same face portion of each of the plurality of test sheets in a selected one of a pair of stacks; and;

gating the test sheets in the stream by use of a gate having the predetermined direction adjacent the exit end portion of the predetermined path by alternately gating the test sheets between a first predetermined portion of the curvilinear path defined by the gate in which the test sheets are inverted into one stack and a second predetermined portion of the curvilinear path which is positioned downstream, past and adjacent the gate which the test sheets are inverted into the other of the stacks.

20. In a method in accordance with claim 19 in which the gating between the first and second predetermined stacks is in response to the scanning of the test sheets.

21. In a method in accordance with claim 19 in which the gating to one of the predetermined stacks gates test sheets rejected in the operation of the scanning apparatus.

22. In a method for stacking a plurality of test sheets in the same order and the same relative position of the same face portion of each of the plurality of test sheets when delivered, the improvement comprising:

sequentially receiving from a test sheet scanning apparatus each of the plurality of test sheets from a stack of test sheets having a predetermined order for the plurality of test sheets and a predetermined relative position of the same face portion of each of the plurality of test sheets therein;

conveying the plurality of test sheets being received sequentially in a stream along a predetermined path toward an exit end portion thereof with each of the test sheets being in the predetermined order and with the same face portion of each of the test sheets facing upwardly with respect to the conveying means;

downstream of the exit end portion of the predetermined path sequentially engaging the same face portion of each of the test sheets in the stream to advance the test sheets with respect to a curvilinear path to invert the test sheets;

stacking the inverted test sheets in the same order and the same relative position of the same face portion of each of the plurality of test sheets in a selected one of a pair of stacks; and;

gating the test sheets adjacent the exit end portion of the predetermined path by alternately the gating between a first predetermined path in which the test sheets are inverted into one stack and a second predetermined path thereof in which the test sheets are inverted into the other of the stacks.

* * * * *

UNITED STATES PATENT AND TRADEMARK OFFICE
CERTIFICATE OF CORRECTION

PATENT NO. : 4,867,437
DATED : September 19, 1989
INVENTOR(S) : George Wise

It is certified that error appears in the above-identified patent and that said Letters Patent is hereby corrected as shown below:

Cover page, U.S. Patent Documents, delete "Fsvklrt" and insert --Fackler--;

Column 1, line 60, delete "univerted" and insert --uninverted--;

Column 3, line 48, delete "is" and insert -- it is --;

Column 4, lines 8,9, delete "Therefore, a test sheet 11 when" and insert -- Therefore, when --;

Column 4, line 11, delete "FIG. 4, the test sheet can" and insert --FIG. 4, can--;

Column 4, line 16, delete "a";

Column 4, line 42, delete "as" and insert --has--;

Column 4, line 44, delete "that is substan-" and insert -- that is, substan- --;

Column 4, line 48, delete "enter" and insert --enters--;

UNITED STATES PATENT AND TRADEMARK OFFICE
CERTIFICATE OF CORRECTION

PATENT NO. : 4,867,437

DATED : September 19, 1989

INVENTOR(S) : George Wise

It is certified that error appears in the above-identified patent and that said Letters Patent is hereby corrected as shown below:

Column 7, line 35, delete "and" and insert --end--;

Column 7, line 65, delete "are" and insert --is--;

Column 9, line 30, delete "of" (second occurrence) and insert --and--; and

Column 10, line 27, delete "gate which" and insert --gate in which--

Column 10, line 63, delete "alternately" and insert --alternating--

Signed and Sealed this

First Day of January, 1991

Attest:

HARRY F. MANBECK, JR.

*Attesting Officer*  *Commissioner of Patents and Trademarks*